United States Patent
Hassan et al.

(10) Patent No.: US 12,061,284 B2
(45) Date of Patent: Aug. 13, 2024

(54) MICROWAVE BIOMETRIC AUTHENTICATION USING MACHINE LEARNING

(71) Applicant: Jumio Corporation, Palo Alto, CA (US)

(72) Inventors: Ahmed M. Hassan, Lee's Summit, MO (US); Reza R. Derakhshani, Shawnee, KS (US); Waleed K. Al-Shaikhli, Kansas City, KS (US); Blake Willig, Tempe, AZ (US); Kyle Hejtmanek, Kansas City, MO (US); Clayton Kettlewell, Minneapolis, MN (US); Ala-Addin Nabulsi, Lenexa, KS (US); George Scott, Weston, MO (US)

(73) Assignee: Jumio Corporation, Sunnyvale, CA (US)

( * ) Notice: Subject to any disclaimer, the term of this patent is extended or adjusted under 35 U.S.C. 154(b) by 822 days.

(21) Appl. No.: 16/534,773

(22) Filed: Aug. 7, 2019

(65) Prior Publication Data

US 2021/0042545 A1    Feb. 11, 2021

(51) Int. Cl.
*G01S 7/41*    (2006.01)
*G06V 40/10*    (2022.01)
(Continued)

(52) U.S. Cl.
CPC .............. *G01S 7/412* (2013.01); *G06V 40/10* (2022.01); *G06V 40/63* (2022.01); *G06V 40/14* (2022.01)

(58) Field of Classification Search
CPC .......... G01S 13/87; G01S 7/032; G01S 13/34; G01S 13/88; G01S 5/14; G01S 5/0289;
(Continued)

(56) References Cited

U.S. PATENT DOCUMENTS 7,554,076 B2 *  6/2009  Wang ...................... F42C 19/06
                                                 250/221
9,229,102 B1 *  1/2016  Wright .................. G01S 13/885
(Continued)

FOREIGN PATENT DOCUMENTS

CN    107710012 A      2/2018
CN    109512436 A      3/2019
EP       3418769 A1 * 12/2018  ......... G01S 13/0209

OTHER PUBLICATIONS

Diederichs, Kailtyn, Amy Qiu, and George Shaker, "Wireless Biometric Individual Identification Utilizing Millimeter Waves." IEEE Sensors Letters vol. 1, No. 1 (2017), pp. 1-4. (Year: 2017).*
Chinese Office Action of Chinese Application No. 2020107888762 Jumio Corporation, dated Oct. 31, 2023, 12 pages.

*Primary Examiner* — Olumide Ajibade Akonai
(74) *Attorney, Agent, or Firm* — Patent Law Works LLP

(57) ABSTRACT

The technology described in this document can be embodied in a method for identifying a user of secured system. The method includes transmitting, using a first transceiver in an array of multiple transceivers, a first electromagnetic signal in the microwave range. An electromagnetic signal representing a first response of a portion of a subject to the first electromagnetic signal is received, by at least one transceiver of the array of multiple transceivers. The subject is identified based at least in part on one or more parameters of the first response.

17 Claims, 14 Drawing Sheets

(51) Int. Cl.
*G06V 40/14* (2022.01)
*G06V 40/60* (2022.01)

(58) Field of Classification Search
CPC ...... G01S 1/024; G01S 5/0205; G01S 5/0252;
G01S 13/878; G01S 7/4004; G01S 13/04;
G01S 13/56; G01S 13/66; G01S 7/41;
G01S 7/412; G01S 7/415; G01S 13/06;
G01S 7/417; G01S 7/4802; G01S 7/539;
G01S 7/35; G01S 13/931; G06F 3/017;
G06F 2218/12; G06F 18/241; G06F
21/32; G06F 18/2132; G06F 18/2411;
G06F 18/24147; G06F 18/24155; G06F
18/24323; G06F 18/25; G06F 18/259;
G06V 10/806; G06V 10/82; G06V
40/1365; G06V 40/20; G06V 40/70;
G06V 40/172; G06V 20/647; G06V
40/10; G06V 40/63; G06V 40/14; B60R
25/252; B60R 25/25; B60R 25/2045;
A61B 5/1172; G06N 20/00; H04B 17/24
See application file for complete search history.

(56) References Cited

U.S. PATENT DOCUMENTS

| | | | |
|---|---|---|---|
| 10,817,065 B1* | 10/2020 | Lien | A63F 13/24 |
| 10,928,498 B1* | 2/2021 | Li | H04W 64/00 |
| 2010/0198083 A1* | 8/2010 | Lin | G01S 13/536 |
| | | | 600/484 |
| 2013/0079027 A1* | 3/2013 | Hand | H04W 16/24 |
| | | | 455/456.1 |
| 2015/0048251 A1* | 2/2015 | Chen | G01V 8/005 |
| | | | 250/349 |
| 2015/0168315 A1* | 6/2015 | Kim | A61B 5/4312 |
| | | | 324/602 |
| 2016/0285480 A1* | 9/2016 | Lv | H04J 1/08 |
| 2018/0031689 A1* | 2/2018 | Ben-Ari | H01Q 13/04 |
| 2018/0059215 A1* | 3/2018 | Turbiner | G01S 15/931 |
| 2018/0224980 A1* | 8/2018 | Avila | G01S 13/89 |
| 2019/0187265 A1* | 6/2019 | Barbello | G06V 40/103 |
| 2020/0088870 A1* | 3/2020 | Tsiklauri | G01S 13/46 |
| 2020/0218793 A1* | 7/2020 | Storm | G06V 40/103 |
| 2020/0234030 A1* | 7/2020 | Baheti | G01S 13/87 |
| 2020/0408876 A1* | 12/2020 | Weber | G01S 7/415 |

* cited by examiner

MICROWAVE BIOMETRIC AUTHENTICATION USING MACHINE LEARNING

TECHNICAL FIELD

This disclosure relates to biometric authentication systems.

BACKGROUND

Biometrics allows a person to be identified and authenticated based on a set of recognizable and verifiable data, which are unique and specific to them. Biometric authentication includes the process of comparing data for a person's characteristics to that person's biometric "template" to determine resemblance. Biometric authentication systems can be grouped based on the physical characteristic employed to authenticate users. Examples of such systems include authentication based on fingerprints, hand geometry, palm veins, retina scans, iris scans, facial recognition, signatures, and voice analysis.

SUMMARY

This document includes a description of how microwave signals scattered or reflected from a target can be measured and processed to identify different users. In some implementations, a system includes an array of antennas to collect the scattered/reflected microwave signals from the target, an interface to a microwave source/receiver, a microwave source/receiver, and computing hardware to perform machine learning identification of the users. Operations can include data collection from users during a training phase, training a machine learning engine with the data from multiple users, storing a database of measurements and machine learning training parameters, and processing collected measurements from users in the database.

In one aspect, this document features a method for microwave biometric authentication using machine learning. The method includes transmitting, using a first transceiver in an array of multiple transceivers, a first electromagnetic signal in the microwave range. An electromagnetic signal representing a first response of a portion of a subject to the first electromagnetic signal is received, by at least one transceiver of the array of multiple transceivers. The subject is identified based at least in part on one or more parameters of the first response.

In another aspect, this document features a system that includes an array of multiple transceivers and a signal processing engine. The transceivers in the array of multiple transceivers can transmit a first electromagnetic signal in the microwave range and receive an electromagnetic signal representing a first response of a portion of a subject to the first electromagnetic signal. The signal processing engine identifies the subject based at least in part on one or more parameters of the first response.

In another aspect, this document features one or more machine-readable storage devices that includes machine-readable instructions configured to cause one or more processing devices to execute various operations. The operations include transmitting, using a first transceiver in an array of multiple transceivers, a first electromagnetic signal in the microwave range. An electromagnetic signal representing a first response of a portion of a subject to the first electromagnetic signal is received, by at least one transceiver of the array of multiple transceivers. The subject is identified based at least in part on one or more parameters of the first response.

Implementations of the above aspects can include one or more of the following features. A second electromagnetic signal can be transmitted, using a second transceiver of the array, in the microwave range. An electromagnetic signal representing a second response of the portion of the subject to the second electromagnetic signal can be received by at least one transceiver of the array of multiple transceivers. Identifying the subject can be based also on one or more parameters of the second response. The first electromagnetic signal and the second electromagnetic signal can be transmitted sequentially. The first electromagnetic signal and the second electromagnetic signal can be transmitted at a same frequency. The first electromagnetic signal and the second electromagnetic signal can be transmitted at different frequencies. The first electromagnetic signal and the second electromagnetic signal can be transmitted concurrently. The first response can indicate exterior and interior features of the subject. The one or more parameters of the first response can include signal strength and phase shift. The array include eight transceivers. The array can include four transceivers. The transceivers in the array can be arranged in a circular arrangement.

Various implementations described herein may provide one or more of the following advantages. A user of a secured system can be identified using microwave radiation. Equipment for transmitting microwave radiation can be generally less expensive than equipment used for other identification approaches. Identification using microwave radiation can be successfully performed even under different lighting conditions. Secure system users can be identified based on hidden, internal biological features that are less prone to spoofing than external biological features. Gathering user information using multiple antennas can result in identification of features from different portions of a subject.

DETAILED DESCRIPTION

This document presents a biometric authentication method in which a user is identified using electromagnetic signals. For example, one or more microwave transceivers in an array of such transceivers can transmit electromagnetic signals that are scattered/reflected from a portion of a human body and received at other transceivers in the array. One or more parameters of the signals received at multiple transceivers or antennas can be used in conjunction to generate a "signature" that can be used to identify a particular user with a high degree of confidence.

Figure 1:
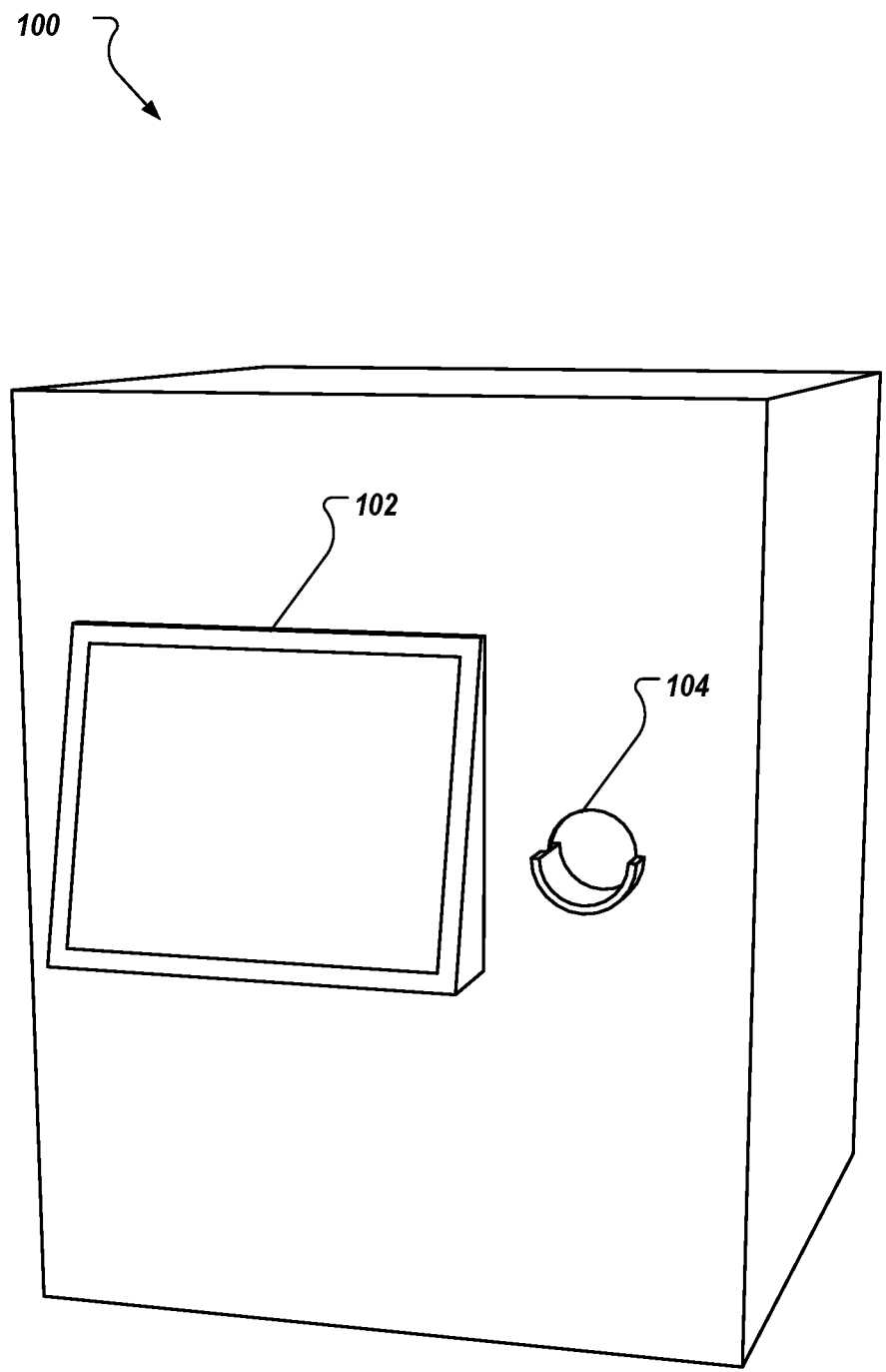
FIG. 1 depicts a kiosk as an example of an environment to which a biometric authentication system may be deployed.

FIG. 1 depicts a kiosk 100 as an example of an environment to which a biometric authentication system may be deployed, according to some implementations of the present disclosure. Such a kiosk device may be used for various purposes that require authenticating users via one or more biometric authentication processes. For example, the kiosk 100 can include an ATM that allows a user to withdraw money from a bank account. In another example, the kiosk 100 may be deployed at a restaurant of a fast-food outlet, and allow a user to order and pay for food. The kiosk 100 may also be deployed at an entry point (e.g., at the gate of an arena or stadium) to authenticate entrants prior to entering the venue. In general, the kiosk 100 may be deployed at various types of locations to authenticate users interactively, or even without any active participation of the user.

As described in more detail below, the kiosk 100 can include one or more components that support a biometric authentication system. For instance, a microwave antenna system, combined with machine learning, can be used for human biometric authentication. Scattering parameters from an antenna array can be used for feature identification and biometric authentication of users of the kiosk 100. Use of microwave radiation can be used as a standalone biometric technique or as a supplement to other biometric or other identification techniques. A user can be prompted (e.g., on a display 102), to place their hand inside a target area 104. Microwave radiation can be used to generate user features, which can be used for user identification.

Figure 2:
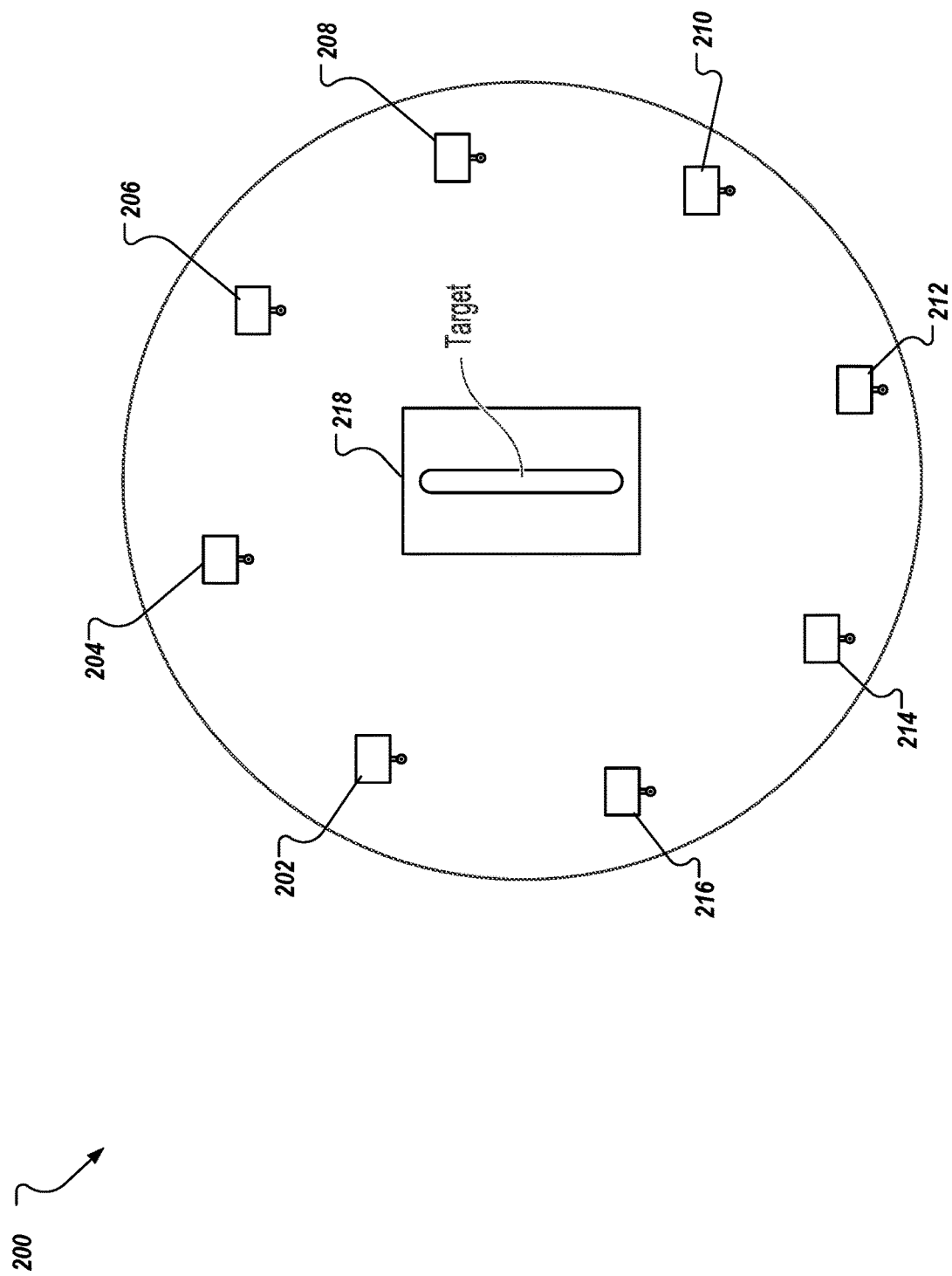
FIG. 2 illustrates an example of an antenna array.

FIG. 2 illustrates an example of an antenna array 200. The kiosk 100 can include the antenna array 200 for biometric authentication based on microwave radiation, for example. The antenna array 200 includes eight antennas 202, 204, 206, 208, 210, 212, 214, and 216. Although eight antennas are shown, a different number of antennas can be used. The antennas 202-216 are positioned in a circular arrangement around a target 218. In some implementations, the target 218 is a handle which a user holds onto as directed.

Each antenna 202-216 can be a transceiver that has an omni-directional radiation pattern capable of transmitting and receiving electromagnetic signals within a predefined range (e.g., in the microwave range, such as between 2.4 and 2.5 GHz). In some implementations, the antennas 202-216 are reverse polarity dipole antennas. In some implementations, optimized multiband patch antennas are used which can minimize direct coupling between adjacent antennas and provide a focused beam to interrogate targets.

As described in more detail below, during user authentication, an electromagnetic signal can be transmitted from each antenna 202-216 (e.g., sequentially) and electromagnetic signals can be received by each of the other antennas. Scattering parameters indicative of the signal received by the other antennas can be recorded as user features and used to identify the user. The scattering parameters can represent a response of a portion of a user to the transmitted electromagnetic signal, for example. Generating user features based on microwave radiation can result in exterior and interior user features being identified. Microwaves can penetrate the human body, for example, into biological tissue, so that interior features of a user are represented in the collected scattering parameters.

Additionally, using multiple antennas in the antenna array 200 can result in more detailed and/or more identified user features, as compared to using one antenna. For instance, if the user places their hand on the target 218, the antennas 202, 204, 214, and 216 may help identify features in the front of the hand and the antennas 206, 208, 210, and 212 may help identify features in the back of the hand. Additionally, using multiple (or more) antennas will generally generate more scattering parameter data, as compared to using a single (or less) antennas, with more scattering parameter data resulting in more (or more detailed) user features, for identification.

Figure 3:
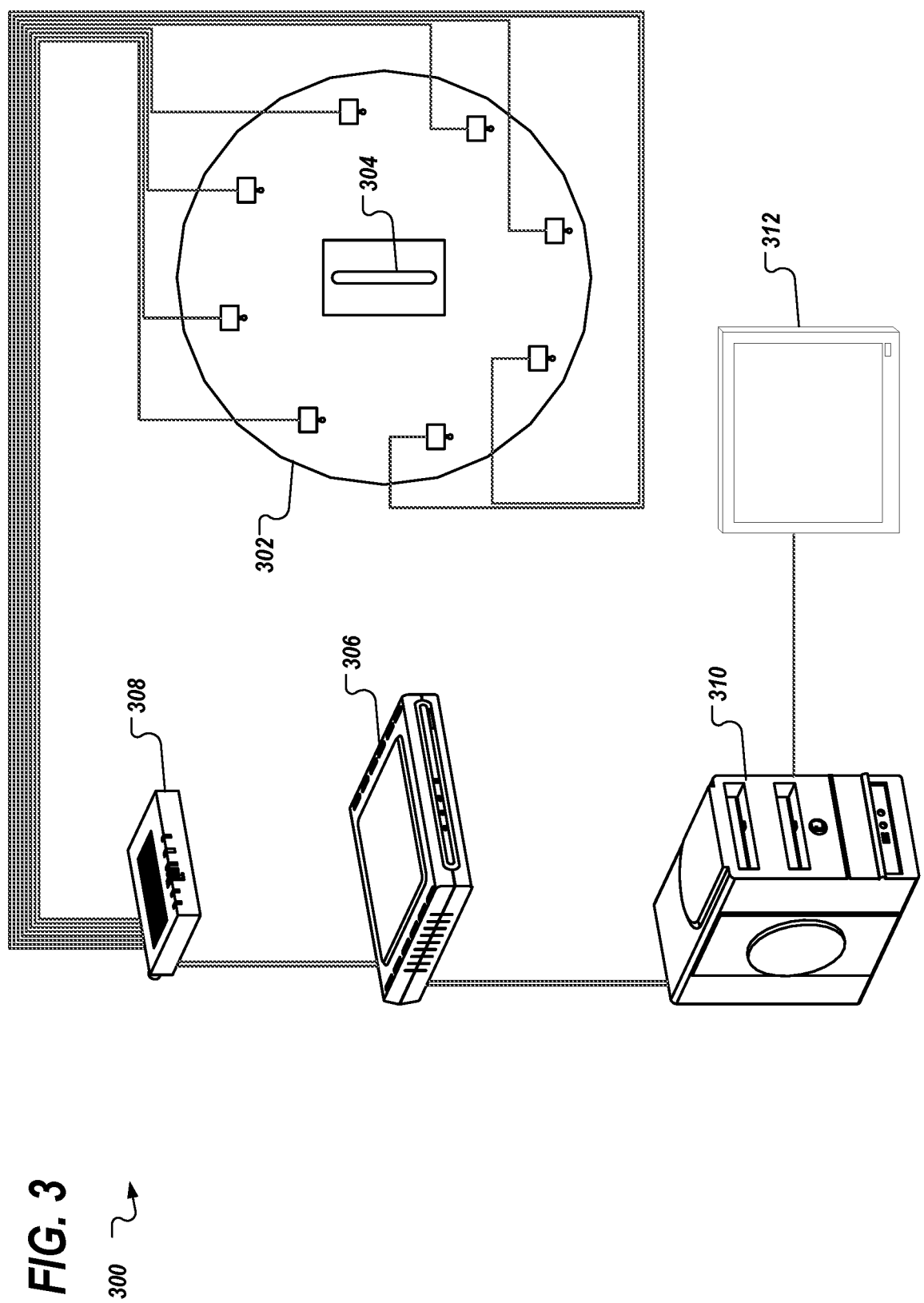
FIG. 3 illustrates an example of a system architecture.

FIG. 3 illustrates an example of a system architecture 300 for the kiosk 100. An antenna array 302 (which can be the antenna array 200) surrounds a target 304. In some implementations, a network analyzer 306 can be used for data collection and signal generation. In another implementation, a dedicated transceiver can be designed and implemented to generate and receive the microwave signals, The network analyzer 306, which can be a Vector Network Analyzer (VNA), can measure both amplitude and phase properties of measured microwave radiation, for example.

In some implementations, the network analyzer 306 can have less ports than antennas. For example, the network analyzer 306 can have one receiving port and one sending port. In some implementations, a switch 308 is used to interface the set of multiple antennas with, for example, two ports of the network analyzer 306. Having a VNA with less receiving or sending ports than antennas can reduce the cost of the kiosk 100, as compared to having a receiving port and a sending port for each antenna.

In some implementations, a frequency of the network analyzer 306 can be set to a predefined frequency (e.g., a sending frequency of the network analyzer 306 can be set to 2.45 GHz at a power level of 0 dBm (1 mW)). A frequency can be selected to balance feature resolution and subject microwave penetration, for example. If too low a frequency is selected, feature resolution may be too low for feature identification/distinction. If too high a frequency is selected, transmitted waves may not penetrate the subject sufficiently enough to generate desired interior features.

The switch 308 and the network analyzer 306 can be controlled by an instrumentation control software application running on a computing device 310 that is connected to the switch 308 and the network analyzer 306. The instrumentation control software application can be configured using a user interface presented on a display 312. In some implementations, the display 312 is the same display as the display 102 of FIG. 1. The instrumentation control software application can be presented on the display 312 when the kiosk 100 is in a configuration mode, for example.

Figure 4:
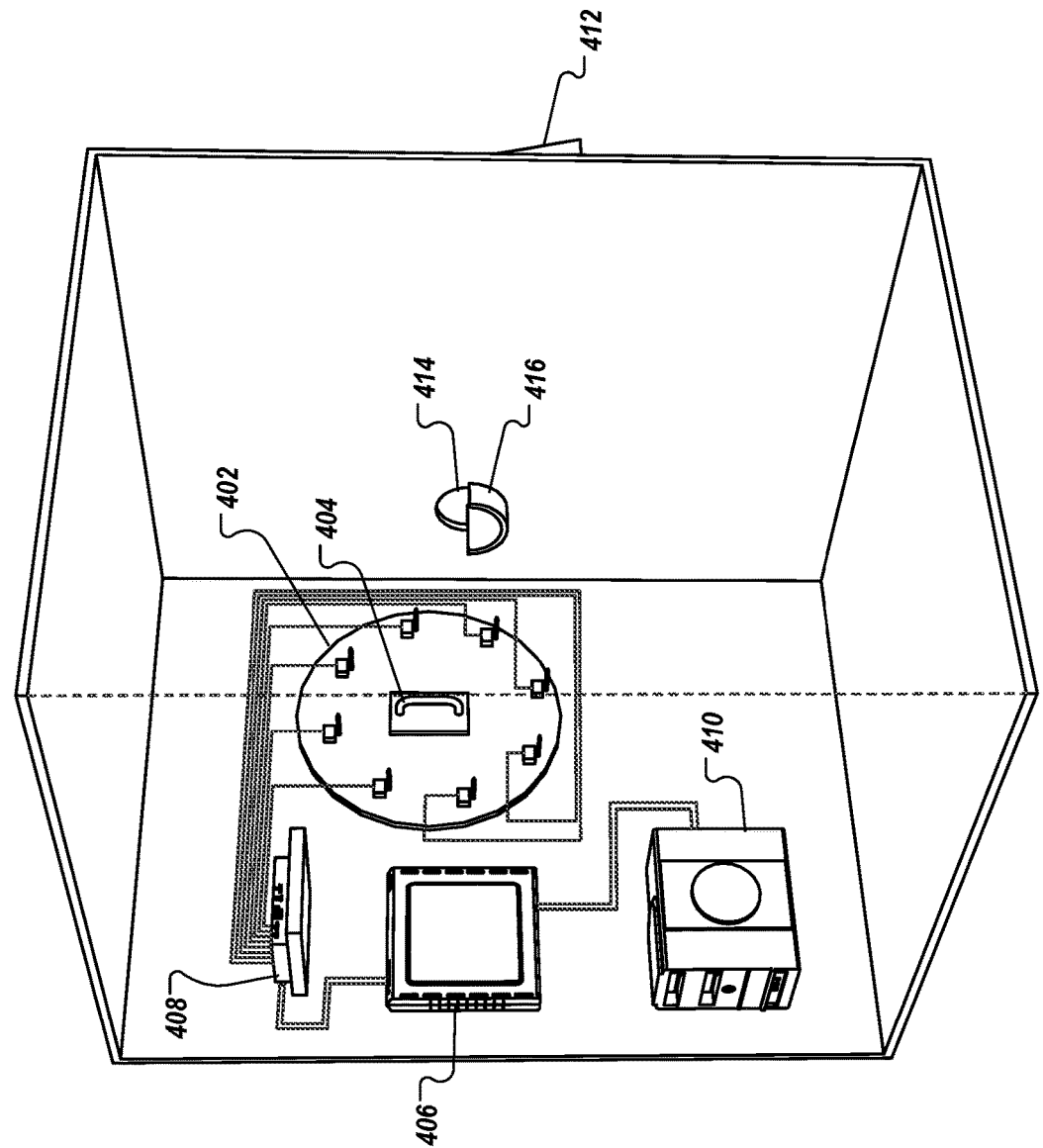
FIG. 4 illustrates an example of a kiosk with interior and exterior components.

FIG. 4 illustrates an example of a kiosk 400 with interior and exterior components. The kiosk 400 includes an antenna array 402, a target (e.g., handle) 404, a network analyzer or a transceiver 406, a switch 408, a computing device 410, and a display 412, which correspond to the antenna array 302, the target 304, the network analyzer 306, the switch 308, the computing device 310, and the display 312, respectively. A target area 414 is an area for a user to place their arm, for example (e.g., as directed by an application running on the kiosk 400).

In some implementations, a forearm stabilizer 416 (e.g., made of foam), can be included in a scanning area to facilitate measurements by minimizing variability in arm location and orientation. In some implementations, steps can be taken to reduce signal interference from outside of the system environment. For instance, the kiosk 400 can be metallic and include signal-absorbing material on the interior of the unit.

Figure 5:
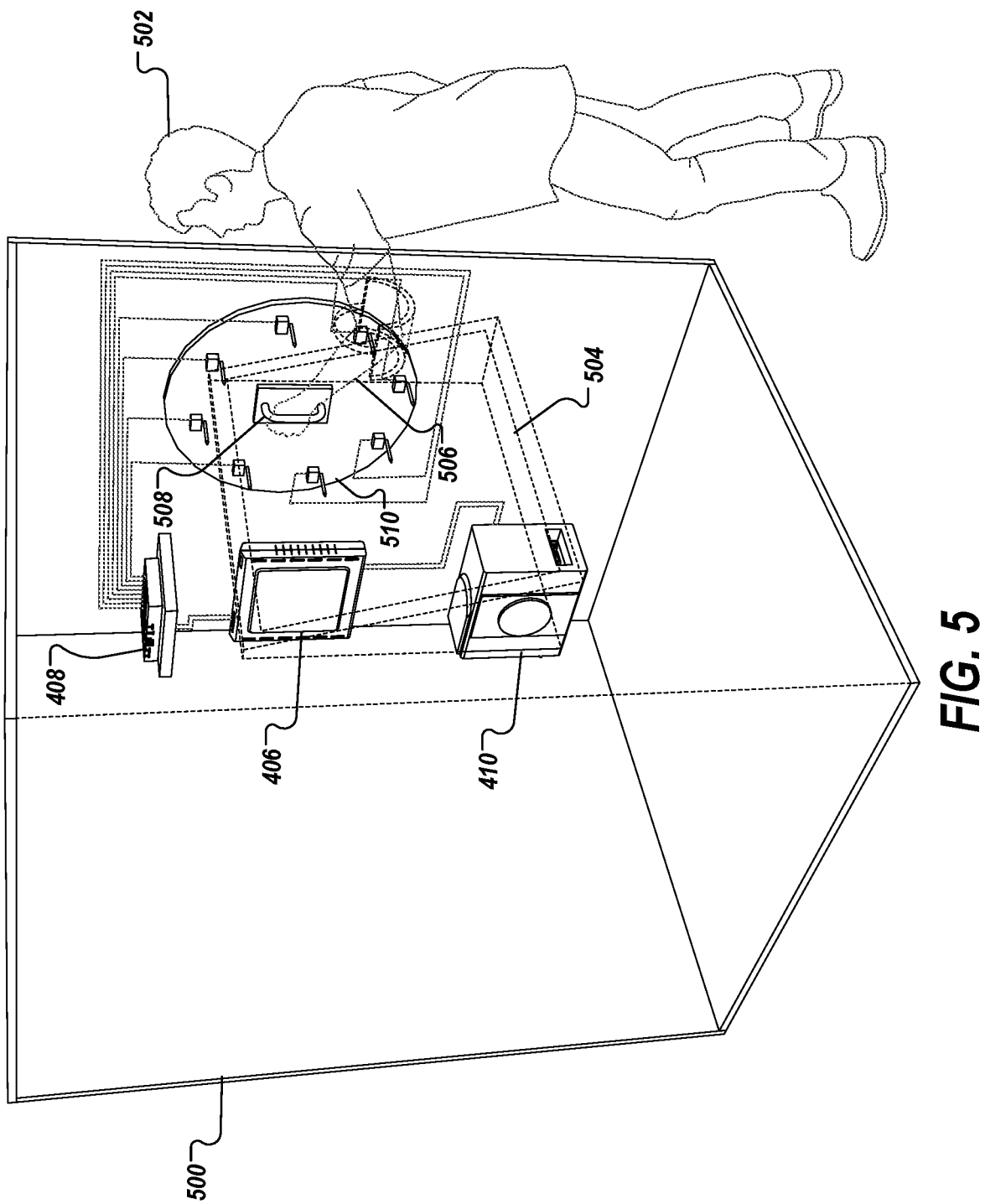
FIG. 5 illustrates an example of a kiosk for performing a biometric authentication process.

FIG. 5 illustrates an example of a kiosk 500 for performing a biometric authentication process. A user 502 is prompted (e.g., on a display 504) to place an arm 506 in a target area and grab a handle 508 as part of the biometric authentication process. Once the arm 506 has been placed, one or more antennas in an antenna (e.g., transceiver) array 510 can transmit electromagnetic signal(s) in the microwave range.

Electromagnetic signals representing a response of the arm 506 to the transmitted electromagnetic signal(s) can be received, at one or more of the antennas in the antenna array 510. For instance, some of the microwaves can reflect off the arm 506 and be received by a transmitting antenna. Original and/or reflected microwaves can be received by the other antennas. In turn, each antenna can act as a transmitting antenna and signals can be received by the other antennas in the array 510.

The user 502 can be identified, based at least in part on one or more parameters of the response to the transmitted signal(s). The parameters of the response can include signal strength and phase properties, for example. The parameters of the response can represent an interrogation of exterior and interior features of the arm 506. Identified features can be used to identify the user, for example, using machine learning.

Although shown as a user placing the arm 506 inside a target area of the kiosk 500, other target areas can be used. For example, the user may be prompted to place a hand on a particular area of the display 504. Although the antenna array 510 is shown as being inside the kiosk 500, in examples where the user is prompted to place a hand on the display 504 or on or near an exterior surface of the kiosk 500, all or a portion of the antennas in the antenna array 510 may be positioned in exterior housing of the kiosk 500 (e.g., the kiosk 500 may have side panels that partially surround the user 502 as the user 502 stands in front of the kiosk 500, and some or all of the antennas in the antenna array 510 can be positioned in the side panels).

The handle 508 can be used for increasing a likelihood that a user's hand is at a consistent location. However, in some implementations, readings can be taken, used, and be effective even when a hand location varies across readings and/or users. For instance, in some examples, passive measurements can be taken. A user may be prompted to interact with a user interface on the display 504, for example, and a response to electromagnetic signals can be recorded as the user uses a hand to interact with a touch screen. Passive (or non-passive) measurements can be recorded as part of an enrollment process.

Data collected during enrollment can be used as training data. For example, a user's first use of a kiosk can include an enrollment process where the user is directed to perform some action which enables an initial set of measurements. For instance, the user 502 may be asked to put their hand on a target area (e.g., handle). As another example, the user 502 may be asked to provide user input, using, for example, a user input device such as a keyboard or a touch screen which results in the user's hand being in a pre-configured area for a particular amount of time, enabling collection of enrollment measurements. In some implementations, multiple passes of measurements are taken in the enrollment process. Enrollment measurements can be stored for the user 502. In a post-enrollment use of the kiosk, the user 502 can be identified, at least in part, based on determining a match between current measurements and enrollment measurements.

As part of configuration of the kiosk 500, electromagnetic data can be recorded in the absence of any target object in between the antennas of the antenna array 510. Electromagnetic data recorded in the absence of a user can be referred to as an incident sample. The incident sample can be subtracted from collected samples to reduce noise that may otherwise be present in collected data.

Machine learning models can be trained, as described below, for particular users. As another example, machine learning models can be trained, for users in general, during a training phase, using, for example, an initial set of users, which may be a test set of users. In some examples, training of machine learning models is done for users in general and for users in particular.

As an example of user-specific training, in some implementations, in a second use of the system (e.g., after enrollment), the system requests or otherwise obtains an additional item of user identification information, to validate a comparison of current measurements to enrollment measurements. If the additional item of user identification matches an identity of a user determined from comparing current measurements to enrollment measurements, the enrollment measurements can be validated (or can have a higher degree of validation).

In some implementations, hyper parameters for one or more machine learning models are tuned. Some or all hyper parameters may be tuned after an enrollment process. As another example, some or all hyper parameters may be tuned after a validation process.

For machine learning classifiers, hyper parameter tuning can be important for optimization. For instance, a SVM (Support Vector Machine) model can use a cost function that determines how much flexibility the model is allowed. Hyper parameters for the cost function can be tuned, e.g., after enrollment and/or validation. As another example, a random forests model can be configured with a number of used features, a number of decision trees, and a tree depth. As yet another example, a KNN (K-Nearest Neighbor) model can be tuned by setting a value for "k" (e.g., how many neighbors are being used for calculations). These and other hyper parameters can be tuned after enrollment and/or validation, or, as mentioned, can be tuned for users in general during a training phase.

In some implementations, after hyper parameters have been tuned, in a subsequent use by a user of the kiosk, the additional item of user identification is requested or otherwise obtained to validate the tuned hyper parameters (e.g., the additional item of user identification can be compared to an identity that has been determined based on a current comparing of current measurements to enrollment measurements). After hyper parameters have been tuned, users may be identified without requesting or obtaining the additional item of user identification (although user authentication may still be performed by a combination of approaches).

Different machine learning techniques can be used for biometric authentication using microwave radiation. Different machine learning techniques can be used to identify and highlight differences in measurements for different users, and to increase accuracy of identification. Machine learning classification approaches can include one or more of Linear Discriminant Analysis (LDA), Support Vector Classifiers (SVC), Random Forests, K-Nearest Neighbors, Naïve Bayesian, and Ensemble Voting. Measurements can be classified using multiple machine learning techniques and one or more machine learning techniques can be identified as optimum (or preferred) techniques, based on a comparison of accuracies achieved by different techniques.

Figure 6:
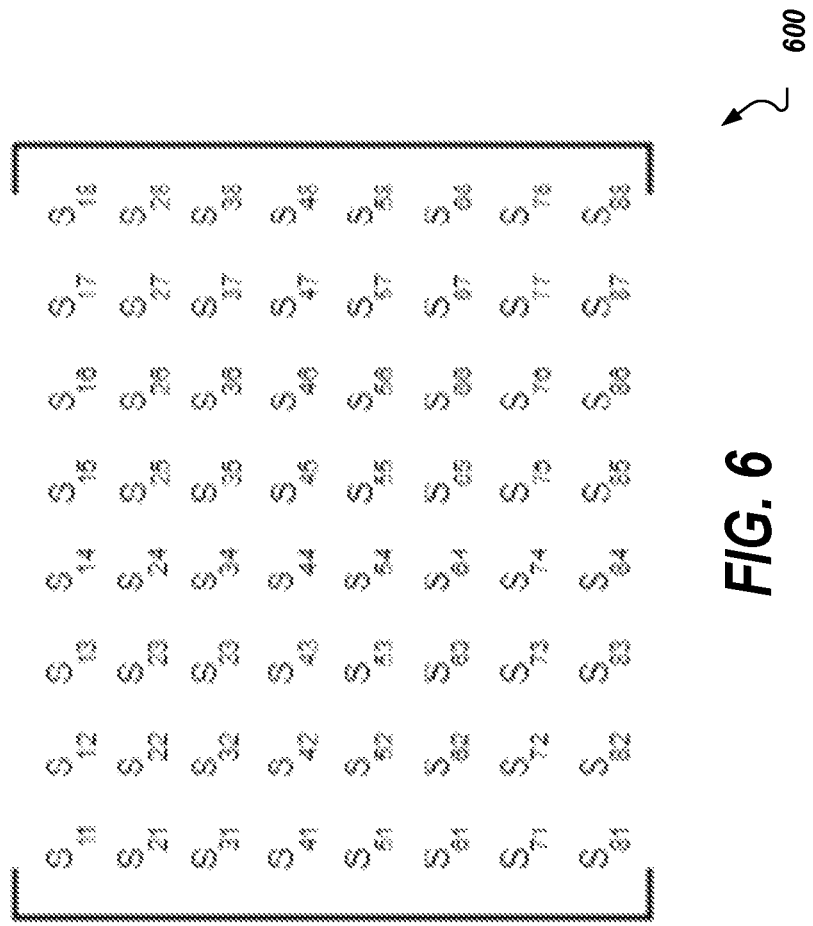
FIG. 6 is an example of a scattering parameters matrix.

FIG. 6 is an example of a scattering parameters matrix 600. Collected scattering parameters can be stored in the scattering parameters matrix 600. Independent scattering parameters can be denoted as $S_{ji}$, where $1<=i<=7$ and $i<=j<=8$ (e.g., when eight antennas are used). Each row of the scattering parameters matrix 600 corresponds to one antenna's signal strength transmitted to all other antennas. Each column corresponds to the signal strength received from a particular antenna from all other antennas.

In some implementations, each $S_{ji}$ value has a real and imaginary component. In some implementations, data is converted from a complex form [Real, Imaginary] into a [Magnitude, Phase] form (e.g., where phase is represented as degrees). The magnitude can range from 0 to 1. In some implementations, phase components having a range of −180 to 180 are normalized to a range of [0, 1].

In some implementations, measurements from adjacent antennas are ignored, discarded, or otherwise discounted. Adjacent antenna measurements may be ignored (or not taken) for efficiency or for interference concerns. For instance, scattering parameters recorded from adjacent antennas can be dominated or otherwise adversely affected by direct coupling which masks a target's contribution. Accordingly, in some implementations, the scattering parameters where i−j=1, are removed from analysis.

Figure 7:
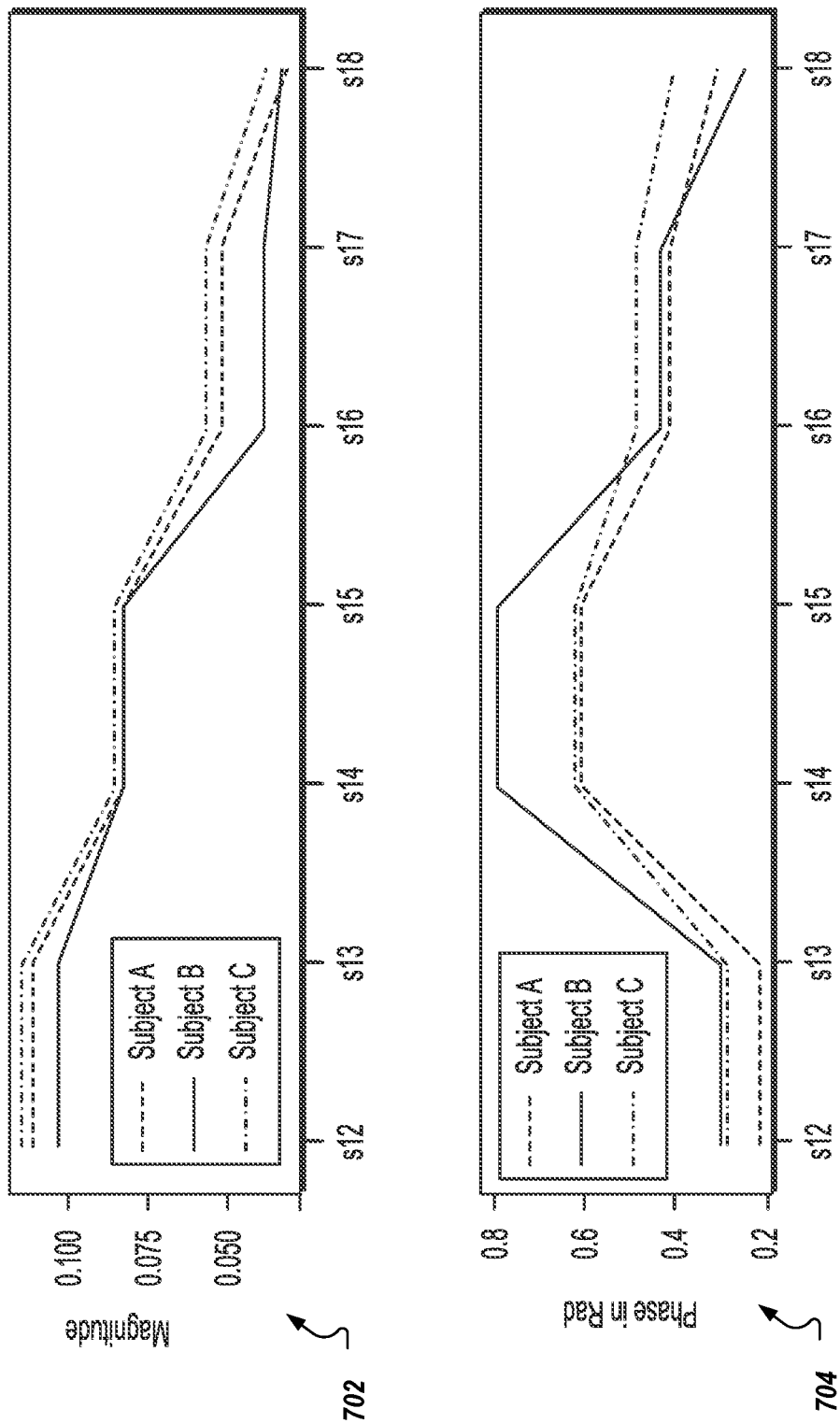
FIG. 7 illustrates examples of scattering parameters from different subjects.

FIG. 7 illustrates examples of scattering parameters for different subjects. A graph 702 and a graph 704 illustrate a subset of magnitude and phase scattering parameters, respectively, for three different users, that were recorded when one antenna was transmitting. Similar data can be recorded when other antennas transmit. Measurements for different users collected when one given antenna is transmitting may be relatively close in value, for some sets of users. However, as additional data is collected when other antennas in the set of antennas are transmitting, differences in collected measurements can be recorded, with those differences further distinguishing users and improving user identification. Additionally, machine learning techniques can highlight these differences and increase classification accuracy.

Figure 8:
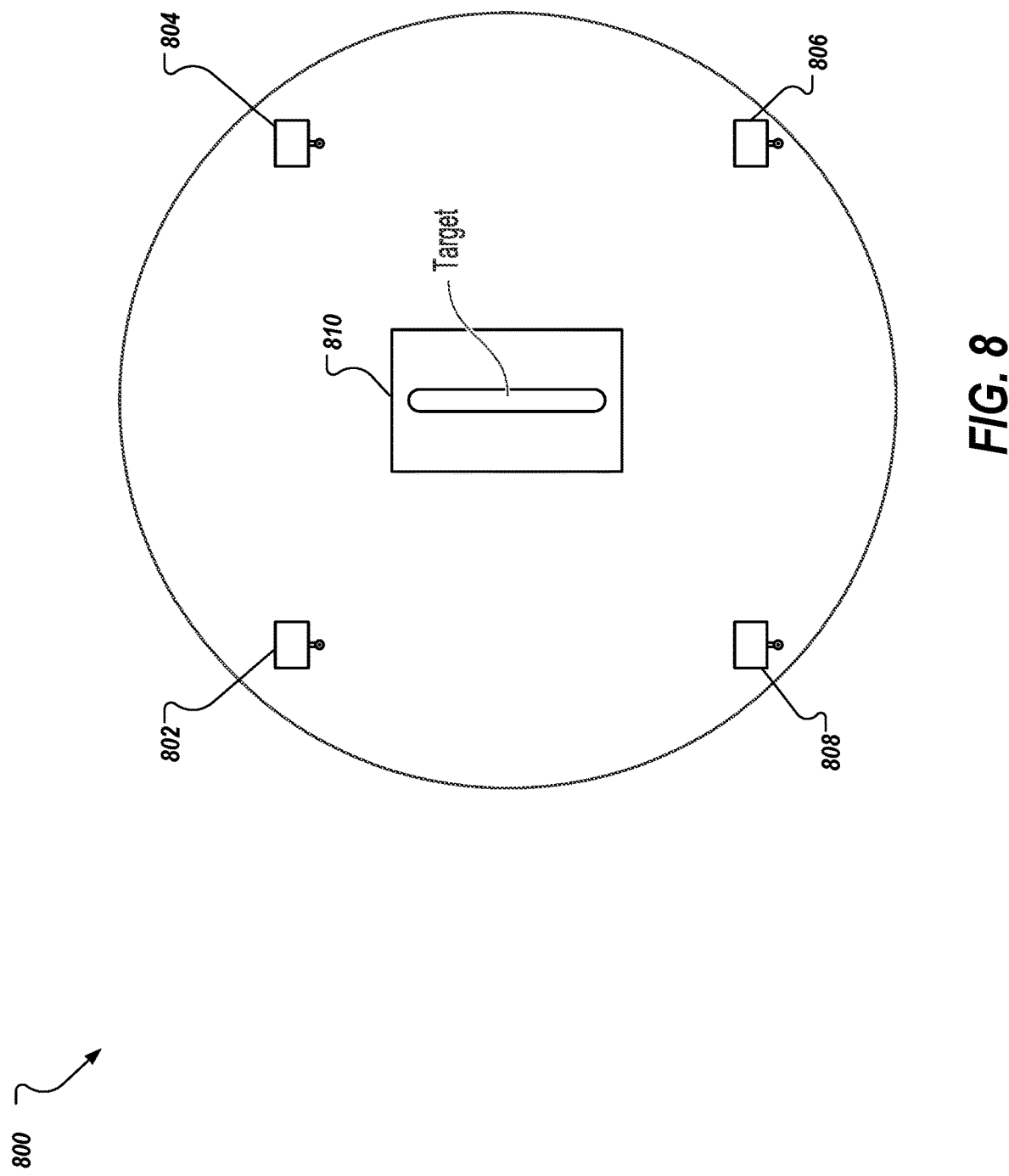
FIG. 8 illustrates another example of an antenna array.

FIG. 8 illustrates another example of an antenna array 800. The antenna array 800 includes fewer antennas than the antenna array 200. Specifically, the antenna array 800 includes four antennas 802, 804, 806, and 808 (around a target 810), as compared to eight antennas for the antenna array 200.

Fewer antennas can be used to reduce cost, for example. In some implementations and for some installations, fewer antennas can be used when a lesser accuracy rate is acceptable and/or when cost concerns have higher importance than accuracy. For instance, four antennas, as compared to eight antennas, can be used for a video game console, e.g., where user identification is employed to track user (e.g., children) daily time limits.

Fewer antennas can be used to keep production costs for the console at a competitive market price. The use of four antennas may produce an accuracy rate of 98%, which may be considered acceptable for the daily time limit tracking of the video game console. Comparatively, eight (or more) antennas may be used for an ATM machine, so that identification accuracy at ATM machines approaches 100% (and, as mentioned, microwave authentication at an ATM may be used with other identification approaches, to further improve accuracy).

During system design, different numbers of antennas can be tested and accuracy rates recorded and compared. A particular number and arrangement of antennas can be chosen, that best suits the application(s) the system is being designed for. In general, a greater number of antennas can result in a greater identification accuracy. However, depending on space constraints, a greater number of antennas can result in increased coupling between adjacent antennas. Coupling can occur when signals reflect off of other antennas, rather than off of the target. Accordingly, during system design, an antenna count and arrangement can be selected to balance cost, accuracy, coupling interference, or other parameters.

In some cases, using fewer antennas can enable other cost saving measures. For instance, using a lesser number of antennas may enable not using a switch. For instance, a number of antennas may be equal to or less than a number of sending ports and receiving ports of a network analyzer. Accordingly, the cost of a switch can be removed from an overall system cost in some examples.

Figure 9:
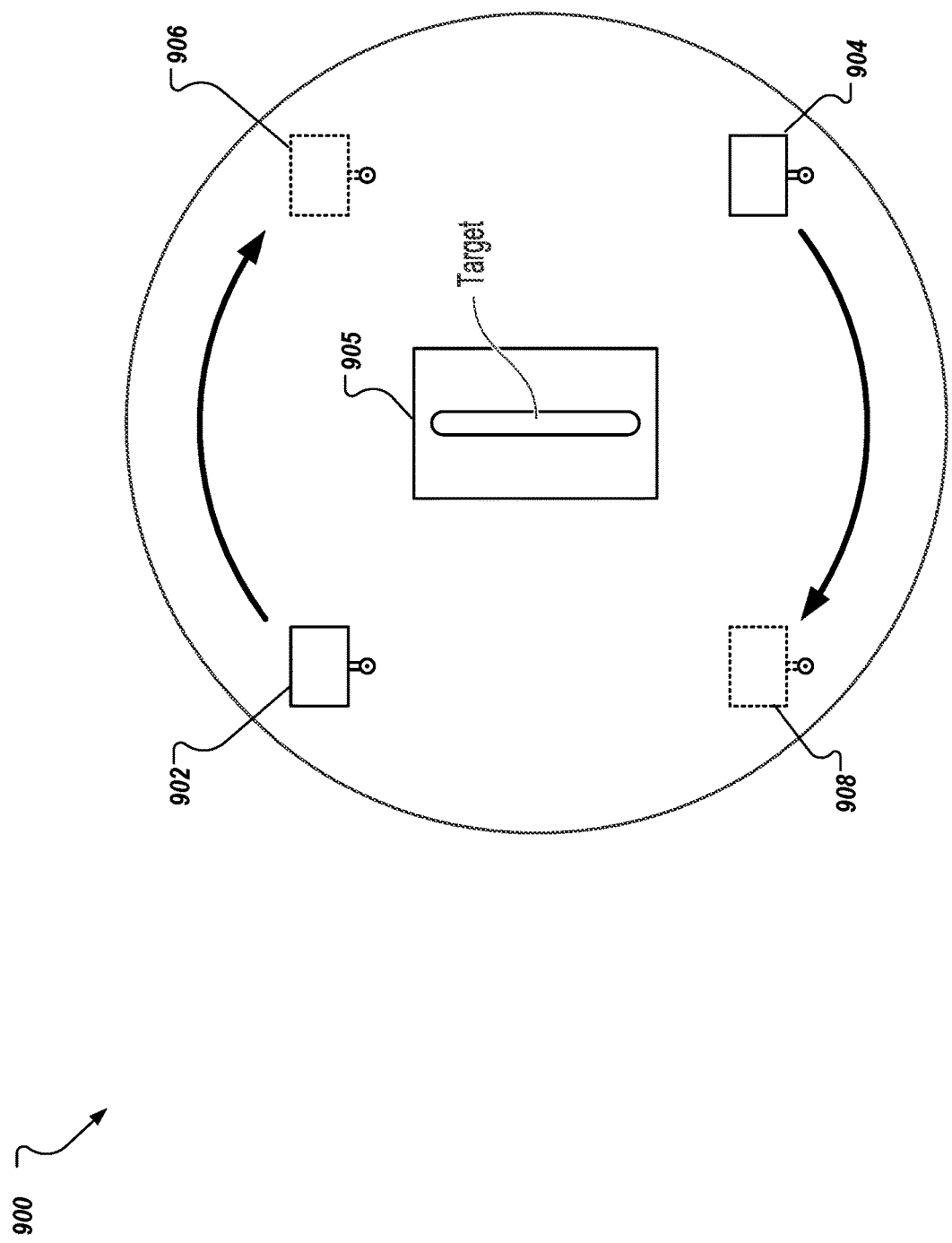
FIG. 9 illustrates an example of an antenna array that uses mechanical rotation of antennas.

FIG. 9 illustrates an example of an antenna array 900 that uses mechanical rotation of antennas. In some implementations, to reduce a number of antennas, mechanical rotation of one or more antennas can be performed. For instance, the antenna array 900 can include two antennas 902 and 904, around a target 905.

At a first point in time, the antennas 902 and 904 can be at first locations, as shown. The antenna 902 can transmit a signal, and a response signal can be received by the antenna 904 (and recorded). Similarly, the antenna 904 can transmit a signal, and a response signal received by the antenna 902 can be recorded. At a second point in time, the antennas 902 and 904 can be mechanically rotated. For instance, the antennas 902 and 904 can be mechanically rotated clockwise, as illustrated by new-location antennas 906 and 908, respectively. When at the new locations, the new-location antennas 906 and 908 can sequentially transmit, with response signals from the receiving antennas recorded.

The use of mechanical rotation can reduce cost, e.g., if a cost of mechanical rotation equipment is less than a cost of antennas that may be able to be removed (or not used) in the system, due to mechanical rotation. Mechanical rotation may increase a time of accuracy processing, as compared to using more antennas without rotation, due to time needed to mechanically rotate antennas. Mechanical rotation can increase accuracy, for example, if multiple rotation stop points are used, with response parameters being taken at each rotation stop location. As discussed above, designers can design a system that best suits a system's accuracy, cost, and processing time needs.

Figure 10:
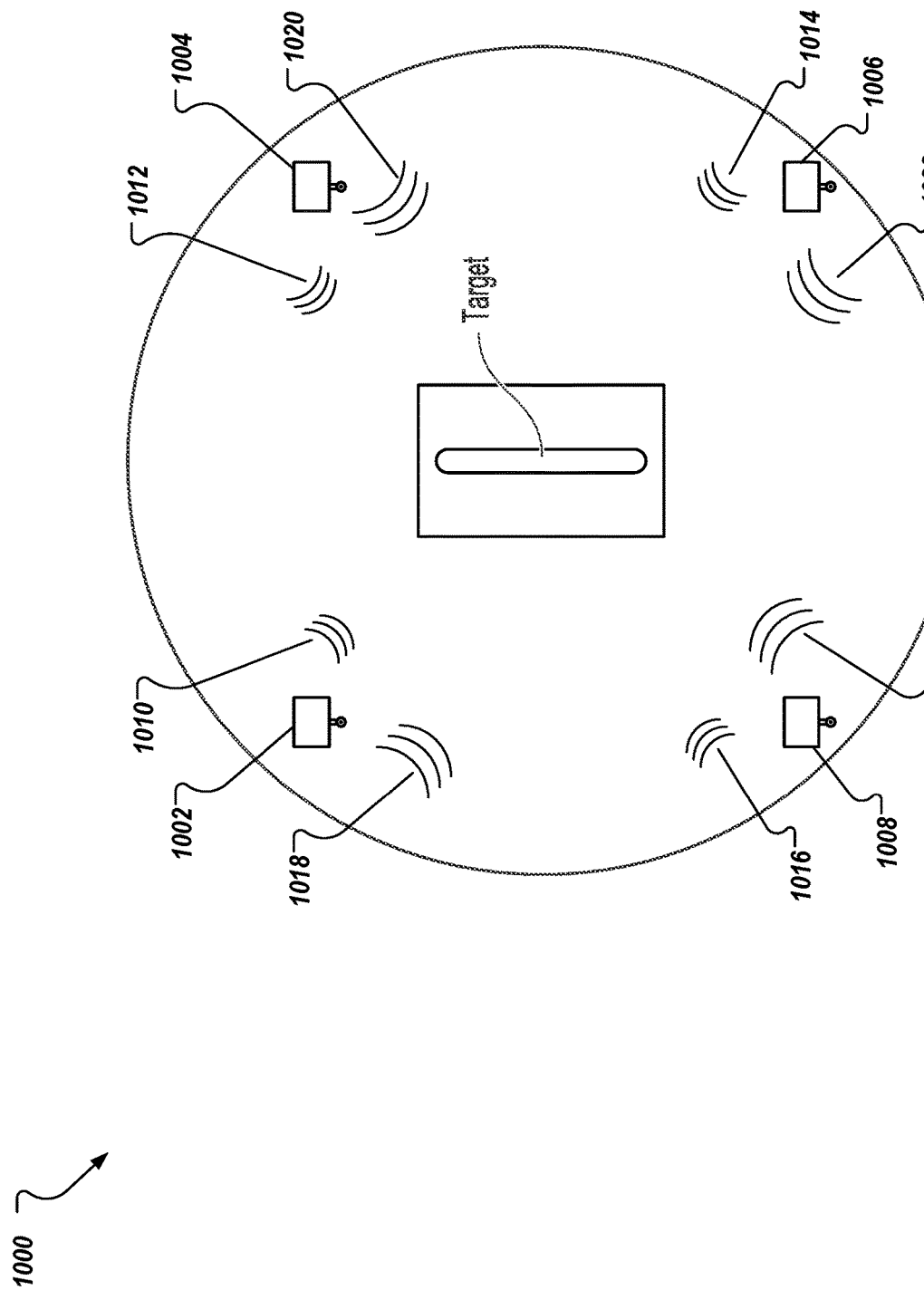
FIG. 10 illustrates using multiple frequencies for antennas in an antenna array.

FIG. 10 illustrates using multiple frequencies for antennas in an antenna array 1000. In some implementations, antenna(s) can transmit at different frequencies. Using more than one frequency can increase signal response diversity, which can help increase identification accuracy. As one example, each antenna 1002, 1004, 1006, and 1008 in the antenna array 1000 can broadcast at a different frequency. Antennas can transmit sequentially, as described above.

As another example, and as shown in FIG. 10, each antenna can broadcast at different frequencies. Multiple passes can be performed, with each pass corresponding to a different frequency. For instance, in a first pass, each antenna 1002, 1004, 1006, and 1008 can sequentially broadcast at a first frequency (e.g., as illustrated by signal indicators 1010, 1012, 1014, and 1016, respectively). In a second pass, each antenna 1002, 1004, 1006, and 1008 can sequentially broadcast at a second frequency that is different than the first frequency (e.g., as illustrated by signal indicators 1018, 1020, 1022, and 1024, respectively)

Using different frequencies can increase accuracy due to some frequencies being better at identifying certain types of user features than other frequencies. For instance, use of higher frequencies can result in achieving higher resolution (and thus more or better identifiable features) of an exterior surface of a user than if lower frequencies are used. Use of lower frequencies can result in more or better identification of interior features of a user than if higher frequencies are used. If both higher and lower frequencies are used, identification of both exterior and interior features can be improved, as compared to use of just higher or just lower frequencies.

In examples where multiple frequencies are used, one or more higher frequencies and one or more lower frequencies can be selected. In examples where one frequency is used, a frequency that has a best balance for determining both exterior and interior features can be chosen. Experiments can be performed to identify the frequency that has the best balance for determining both exterior and interior features.

In some implementations, multiple antennas can be broadcasting signals at different frequencies simultaneously. For example, each of the antennas 1002, 1004, 1006, and 1008 can be broadcasting different frequencies at a same time. Pertinent response signals received at each antenna 1002, 1004, and 1006, and 1008 can be filtered out for each frequency. When multiple antennas are simultaneously broadcasting signals at different frequencies, multiple signal sources can be used. A tradeoff of additional cost (from multiple signal sources) versus lower processing time and higher accuracy can be considered. Use of multiple sources can alleviate a need for a switch, which can reduce costs. Processing time can be reduced by simultaneously broadcasting signals at different frequencies, since multiple passes and/or mechanical rotation can be avoided, while still achieving higher accuracy produced from the diversity obtained from using multiple frequencies.

In some implementations, mechanical rotation and use of multiple frequencies can be combined. For instance, each antenna can broadcast at different frequencies while at a first location, and after mechanical rotation has been performed, each antenna can broadcast at a second, different frequency when at a second, different location.

Figure 11:
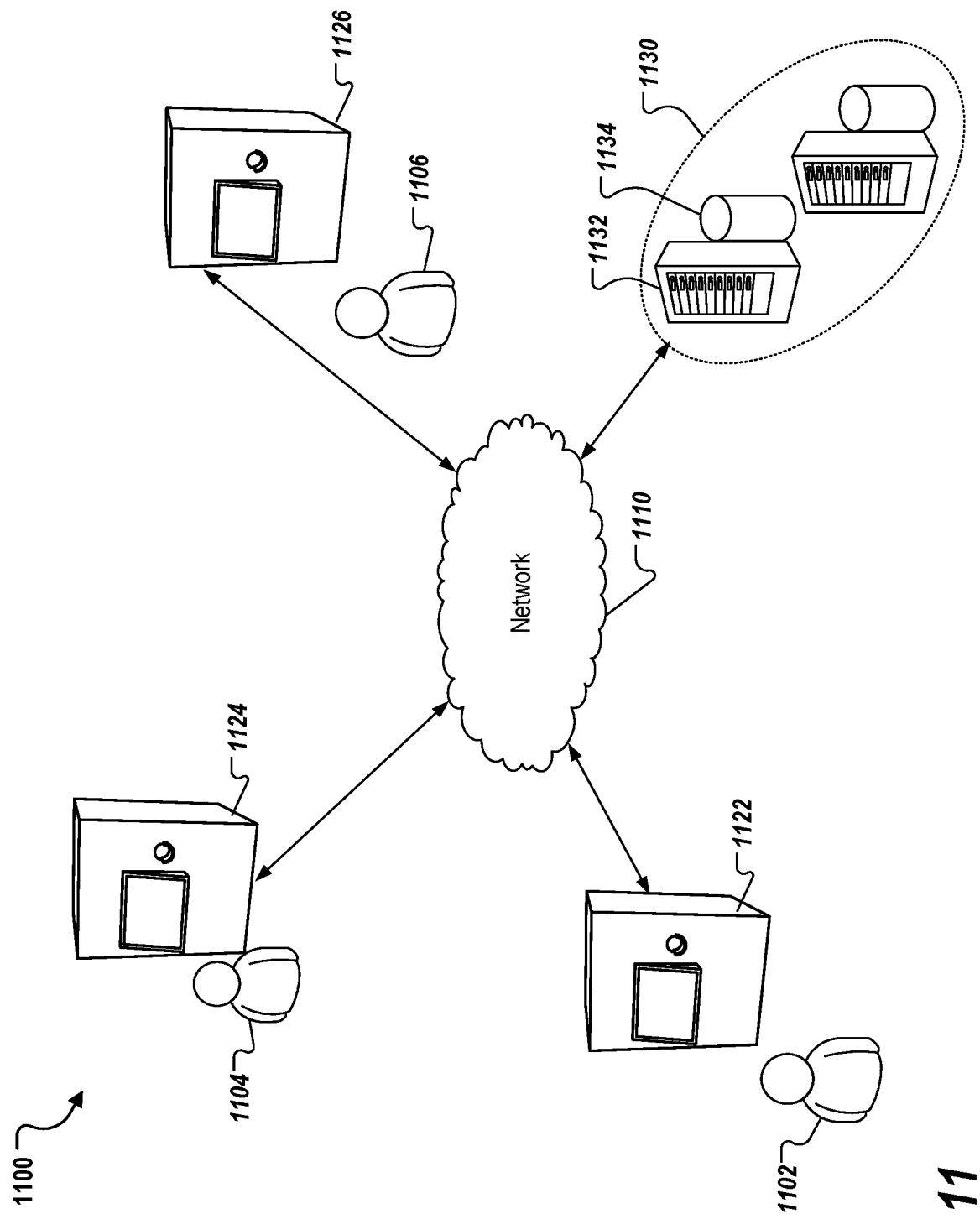
FIG. 11 depicts an example of an environment that can be employed to execute and/or coordinate multiple instances of the described biometric authentication system.

FIG. 11 depicts an example of an environment 1100 that can be employed to execute and/or coordinate multiple instances of the described biometric authentication system. The example environment 1100 includes network 1110, a back-end system 1130, and kiosk devices 1122-1126. The kiosk devices 1122-1126 are substantially similar to the kiosk device 100 of FIG. 1.

In some implementations, the network 1110 includes a local area network (LAN), wide area network (WAN), the Internet, or a combination thereof, and connects computing devices (e.g., the kiosk devices 1122-1126) and back-end systems (e.g., the back-end system 1130). In some implementations, the network 1110 can be accessed over a wired and/or a wireless communications link.

In the depicted example, the back-end system 1130 includes at least one server system 1132 and a data store 1134. In some implementations, the back-end system 1130 provides access to one or more computer-implemented services with which the kiosks 1122-1136 may interact. The computer-implemented services may be hosted on, for example, the at least one server system 1132 and the data store 1134. The computer-implemented services may include, for example, an authentication service that may be used by the kiosks 1122-1136 to authenticate a user 1102, 1104, or 1106, respectively, based on collected feature data derived from responses to electromagnetic signals.

In some implementations, the back-end system 1130 includes computer systems employing clustered computers and components to act as a single pool of seamless resources when accessed through the network 1110. For example, such implementations may be used in data center, cloud computing, storage area network (SAN), and network attached storage (NAS) applications. In some implementations, the back-end system 1130 is deployed and provides computer-implemented services through a virtual machine(s).

Figure 12:
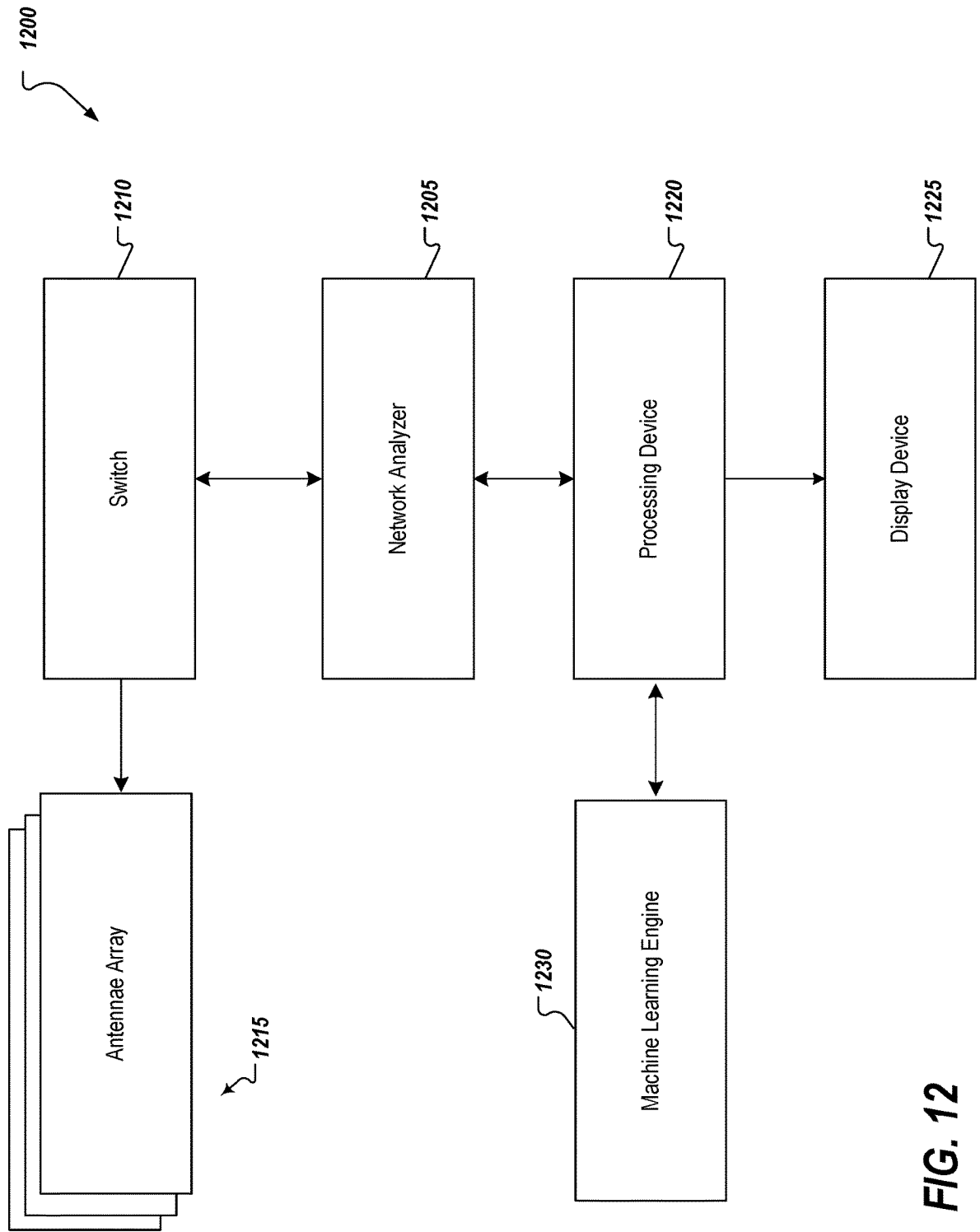
FIG. 12 shows an example of a system in which the technology described herein may be used.

FIG. 12 shows an example of a system 1200 in which the technology described herein may be used. The system 1200 includes a network analyzer 1205 that can, in some implementations with use a switch 1210, cause transmission of electromagnetic signals from each antenna in an antenna array 1215. The network analyzer 1205 can record electromagnetic signals that are received, as response signals, at each antenna in the antenna array 1215, in response to the transmitted signals. The network analyzer 1205 and the switch 1210 can be controlled by an application running on a processing device 1220. In some implementations, the output of the processing device 1220 may be used to drive a display device 1225.

The system 1200 also includes a machine learning engine 1230 that can be configured to analyze response signals captured by the network analyzer 1205. The machine learning engine 1230 can be configured to analyze the captured electromagnetic signals in various ways, in order to determine features that can be used for user identification and to generate a user identification result (e.g., a user being identified or not identified).

In some implementations, the machine learning engine 1230 is executed by the processing device 1220. In some implementations, the machine learning engine 1230 resides on a computing device (e.g., a server) that is at a remote location with respect to the processing device 1220 and/or the network analyzer 1205. For example, the network analyzer 1205 can be disposed at a kiosk that communicates over a network with a remote server on which the machine learning engine 1230 executes. The machine learning engine 1230 can in turn provide an output of user identification analysis to application running on the kiosk.

Figure 13:
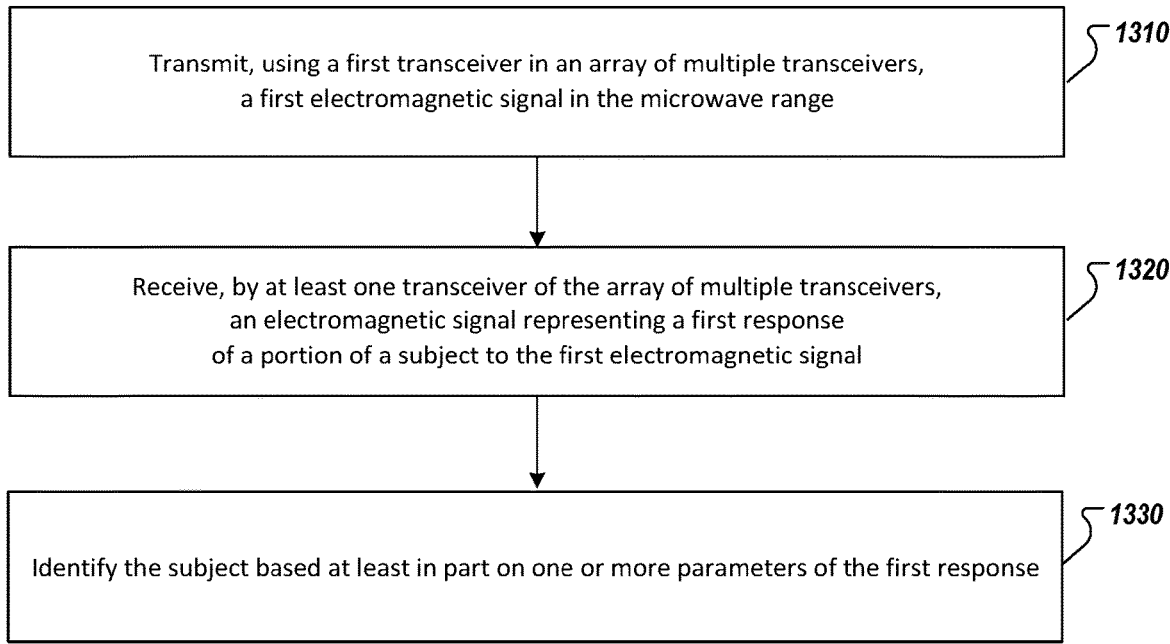
FIG. 13 is a flowchart of an example of a process for identifying a user of a secured system.

FIG. 13 is a flowchart of an example of a process 1300 for identifying a user of a secured system. In some implementations, at least a portion of the process 1300 may be executed by one or more processing devices disposed within a kiosk such as the kiosk 100, described with reference to FIG. 1. In some implementations, the process 1300 may be executed by the network analyzer 1205, the processing device 1220, and the machine learning engine 1230, which may be disposed within a kiosk, within a mobile device, or at one or more servers.

At 1310, a first electromagnetic signal in the microwave range is transmitted, using a first transceiver in an array of multiple transceivers. The array can be arranged in a circular arrangement, for example, and can include a predetermined number of transceivers (e.g., four, eight).

At 1320, an electromagnetic signal representing a first response of a portion of a subject to the first electromagnetic signal is received, by at least one transceiver of the array of multiple transceivers. The first response can indicate exterior and interior features of the subject.

At 1330, the subject is identified based at least in part on one or more parameters of the first response. Parameters of the first response can include signal strength/amplitude and/or phase properties, for example.

In some implementations, a second electromagnetic signal is transmitted in the microwave range, using a second transceiver of the array. An electromagnetic signal representing a second response of the portion of the subject to the second electromagnetic signal can be received, and the subject can be identified based on one or more parameters of the second response as well as one or more parameters of the first response. The first electromagnetic signal and the second electromagnetic signal can be transmitted sequentially. In some implementations, the first electromagnetic signal and the second electromagnetic signal are transmitted at a same frequency. In other implementations, the first electromagnetic signal and the second electromagnetic signal are transmitted at different frequencies. When transmitted at different frequencies, the first electromagnetic signal and the second electromagnetic signal can be transmitted sequentially or consecutively.

Figure 14:
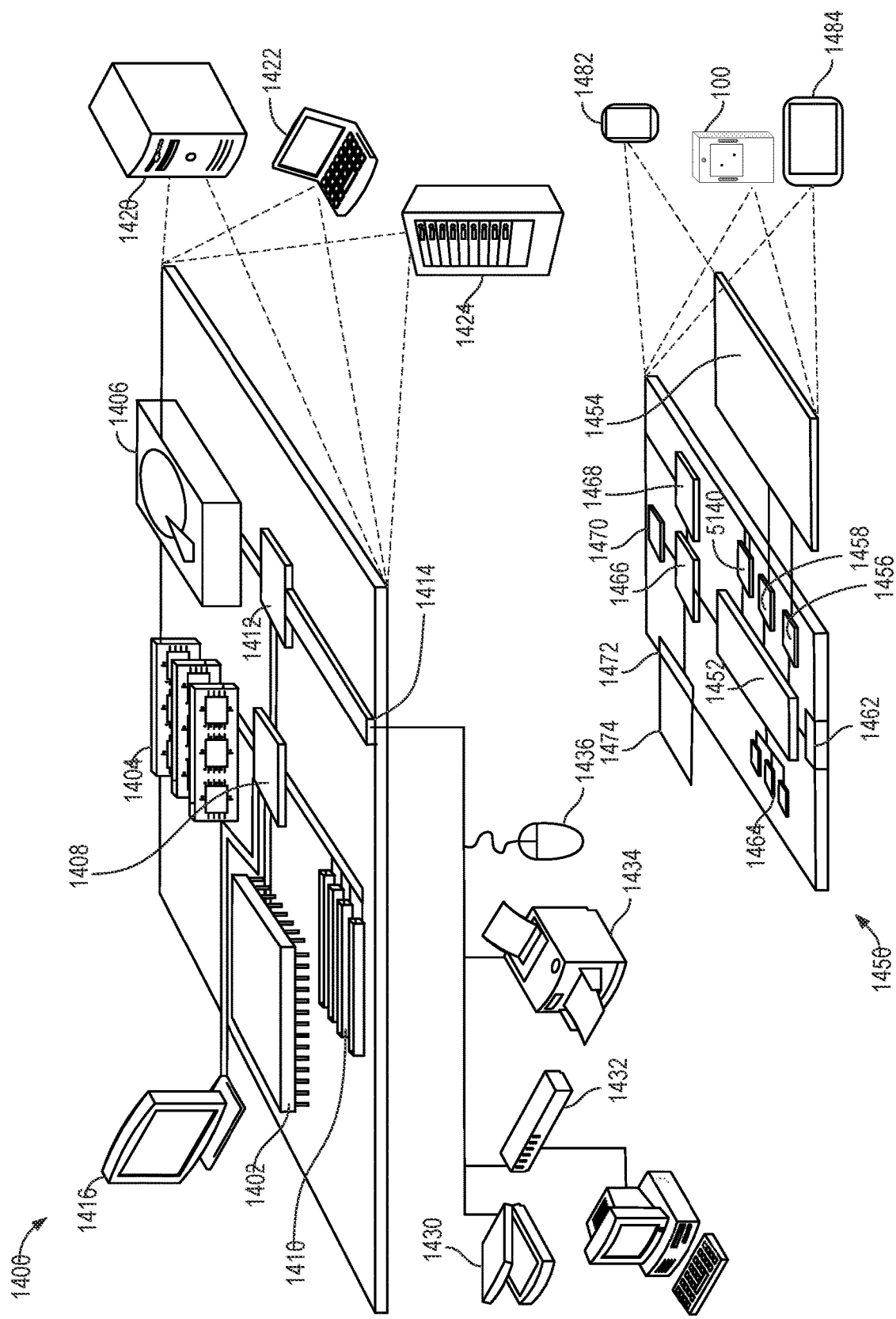
FIG. 14 shows an example of a computing device and a mobile device, which may be used with the techniques described herein.

FIG. 14 shows an example of a computing device 1400 and a mobile device 1450, which may be used with the techniques described herein. For example, referring to FIG. 1, the kiosk device 106 can include one or more of the computing device 1400 or the mobile device 1450, either in part or in its entirety. The mobile device 106 can be the mobile device 1450, for example. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, memory on processor 1402, or a propagated signal.

The high speed controller 1408 manages bandwidth-intensive operations for the computing device 1400, while the low speed controller 1412 manages lower bandwidth-intensive operations. Such allocation of functions is an example only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provide in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, WiFi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, and so forth) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A computer-implemented method comprising:
transmitting, using a first transceiver in an array of multiple transceivers in a circular arrangement around a target at a kiosk during an enrollment period, a first electromagnetic signal in a microwave range, wherein the multiple transceivers are capable of mechanical rotation around the target;
receiving, at the kiosk during the enrollment period, by at least one other transceiver of the array of multiple transceivers, training data comprising a collection of enrollment measurements associated with a user of the kiosk, the collection of enrollment measurements comprising a plurality of responses to the first electromagnetic signal, the collection of enrollment measurements representing a first response of a portion of a subject to the first electromagnetic signal;
transmitting, at the kiosk during an authentication process, using a second transceiver in the array of multiple transceivers, a second electromagnetic signal in a microwave range;
receiving, at the kiosk during the authentication process, by at least one transceiver of the array of multiple transceivers, the at least one transceiver being different from the second transceiver, an electromagnetic signal representing a second response of the portion of the subject to the second electromagnetic signal; and
identifying the subject during the authentication process as the user based at least in part on comparing the collection of enrollment measurements associated with the first response with one or more parameters of the electromagnetic signal representing the second response.

2. The method of claim 1, the method further comprising:
transmitting, at the kiosk during the authentication process, using the first transceiver in the array of multiple transceivers, a third electromagnetic signal in a microwave range;
receiving, at the kiosk during the authentication process, by at least one transceiver of the array of multiple transceivers, the at least one transceiver being different from the first transceiver, an electromagnetic signal representing a third response of the portion of the subject to the third electromagnetic signal,
wherein identifying the subject is based also on one or more parameters of the third response and wherein the third electromagnetic signal and the second electromagnetic signal are transmitted sequentially.

3. The method of claim 1, the method further comprising:
transmitting, at the kiosk during the authentication process, using the first transceiver in the array of multiple transceivers, a third electromagnetic signal in a microwave range;
receiving, at the kiosk during the authentication process, by at least one transceiver of the array of multiple transceivers, the at least one transceiver being different from the first transceiver, an electromagnetic signal representing a third response of the portion of the subject to the third electromagnetic signal,
wherein identifying the subject is based also on one or more parameters of the third response and wherein the third electromagnetic signal and the second electromagnetic signal are transmitted at a same frequency.

4. The method of claim 1, the method further comprising:
transmitting, at the kiosk during the authentication process, using the first transceiver in the array of multiple transceivers, a third electromagnetic signal in a microwave range;
receiving, at the kiosk during the authentication process, by at least one transceiver of the array of multiple transceivers, the at least one transceiver being different from the first transceiver, an electromagnetic signal representing a third response of the portion of the subject to the third electromagnetic signal,
wherein identifying the subject is based also on one or more parameters of the third response and wherein the third electromagnetic signal and the second electromagnetic signal are transmitted at different frequencies.

5. The method of claim 4, wherein the third electromagnetic signal and the second electromagnetic signal are transmitted concurrently.

6. The method of claim 1, wherein the first response indicates exterior and interior features of the subject.

7. The method of claim 1, wherein the one or more parameters of the first response include signal strength and phase shift.

8. The method of claim 1, wherein the array includes eight transceivers.

9. The method of claim 1, wherein the array includes four transceivers.

10. A system comprising:
an array of multiple transceivers in a circular arrangement around a target at a kiosk,
wherein the multiple transceivers are capable of mechanical rotation around the target; and
a signal processing engine;
wherein transceivers in the array of multiple transceivers are configured to:
transmit, using a first transceiver in the array of multiple transceivers during an enrollment period, a first electromagnetic signal in a microwave range; and
receive, during the enrollment period, by at least one other transceiver of the array of multiple transceivers, the at least one other transceiver being different from the first transceiver, training data comprising a collection of enrollment measurements associated with a user of the kiosk, the collection of enrollment measurements comprising a plurality of responses to the first electromagnetic signal, the collection of enrollment measurements representing a first response of a portion of a subject to the first electromagnetic signal;
transmit, during an authentication process, using a second transceiver in the array of multiple transceivers, a second electromagnetic signal in a microwave range;
receive, during the authentication process, by at least one transceiver of the array of multiple transceivers, the at least one transceiver being different from the second transceiver, an electromagnetic signal representing a second response of the portion of the subject to the electromagnetic signal; and
wherein the signal processing engine is configured to identify the subject during the authentication process as the user based at least in part on comparing the collection of enrollment measurements associated with the first response with one or more parameters of the electromagnetic signal representing the second response.

11. The system of claim 10, wherein the first response indicates exterior and interior features of the subject.

12. The system of claim 10, wherein the one or more parameters of the first response include signal strength and phase shift.

13. The system of claim 10, wherein the array includes eight transceivers.

14. One or more non-transitory machine-readable storage devices comprising machine-readable instructions configured to cause one or more processing devices to execute operations comprising:

transmitting, using a first transceiver in an array of multiple transceivers in a circular arrangement around a target during an enrollment period, a first electromagnetic signal in a microwave range, wherein the multiple transceivers are capable of mechanical rotation around the target;

receiving, during the enrollment period, by at least one other transceiver of the array of multiple transceivers, training data comprising a collection of enrollment measurements associated with a user, the collection of enrollment measurements comprising a plurality of responses to the first electromagnetic signal, the collection of enrollment measurements representing a first response of a portion of a subject to the first electromagnetic signal;

transmitting, at a kiosk during an authentication process, using a second transceiver in the array of multiple transceivers, a second electromagnetic signal in a microwave range;

receiving, at the kiosk during the authentication process, by at least one transceiver of the array of multiple transceivers, the at least one transceiver being different from the second transceiver, an electromagnetic signal representing a second response of the portion of the subject to the second electromagnetic signal; and identifying the subject during the authentication process as the user based at least in part on comparing the collection of enrollment measurements associated with the first response with one or more parameters of the electromagnetic signal representing the second response.

15. The one or more non-transitory machine-readable storage devices of claim 14, wherein the first response indicates exterior and interior features of the subject.

16. The one or more non-transitory machine-readable storage devices of claim 14, wherein the one or more parameters of the first response include signal strength and phase shift.

17. The method of claim 1, wherein the training data is stored in a data store included in a back-end system, the back-end system including at least one server providing access to an authentication service that is used by the kiosk over a network, the authentication service providing the collection of enrollment measurements during the authentication process.

* * * * *